US008139480B2

United States Patent
Park et al.

(10) Patent No.: US 8,139,480 B2
(45) Date of Patent: Mar. 20, 2012

(54) COMMUNICATION METHOD BASED ON TRANSMISSION CONTROL PROTOCOL AND MOBILE COMMUNICATION TERMINAL TO PERFORM THE METHOD

(75) Inventors: Hyoung Sang Park, Seoul (KR); Hyun Soo Kim, Yongin-si (KR); Sung Woo Han, Seoul (KR)

(73) Assignee: Pantech Co., Ltd., Seoul (KR)

( * ) Notice: Subject to any disclaimer, the term of this patent is extended or adjusted under 35 U.S.C. 154(b) by 239 days.

(21) Appl. No.: 12/369,500

(22) Filed: Feb. 11, 2009

(65) Prior Publication Data

US 2009/0303877 A1 Dec. 10, 2009

(30) Foreign Application Priority Data

Jun. 4, 2008 (KR) ........................ 10-2008-0052623

(51) Int. Cl.
*H04L 12/26* (2006.01)
(52) U.S. Cl. ...................................................... 370/229
(58) Field of Classification Search ........... 370/229–237
See application file for complete search history.

(56) References Cited

U.S. PATENT DOCUMENTS

| 6,646,987 | B1 | 11/2003 | Qaddoura |
| 7,304,951 | B2 | 12/2007 | Rhee |
| 7,444,136 | B1* | 10/2008 | Gazzard ...................... 455/414.1 |
| 2004/0039820 | A1* | 2/2004 | Colby et al. .................. 709/226 |
| 2005/0135248 | A1* | 6/2005 | Ahuja et al. ................... 370/235 |
| 2005/0165923 | A1* | 7/2005 | Miyake et al. ................ 709/223 |
| 2005/0254420 | A1* | 11/2005 | Wager et al. .................. 370/230 |
| 2007/0076621 | A1* | 4/2007 | Malhotra et al. .............. 370/252 |
| 2009/0052322 | A1* | 2/2009 | Simonsson et al. ........... 370/235 |

FOREIGN PATENT DOCUMENTS

| KR | 10-2005-0111194 | 11/2005 |
| KR | 10-2006-0005834 | 1/2006 |
| KR | 10-2006-0010019 | 2/2006 |
| KR | 10-2006-0090903 | 8/2006 |
| KR | 10-2007-0057632 | 6/2007 |
| KR | 10-2007-0060622 | 6/2007 |

* cited by examiner

*Primary Examiner* — Kwang B Yao
*Assistant Examiner* — Juvena Loo
(74) *Attorney, Agent, or Firm* — H.C. Park & Associates, PLC

(57) ABSTRACT

A telecommunication method based on transmission control protocol (TCP) includes setting an initial value of a congestion window according to a communication situation of a communication network to more efficiently use uncongested bandwidth of the communication network. An IP network access unit in a telecommunication network determines a congestion window value based on a predetermined reference, and transmits the determined congestion window value to the mobile telecommunication terminal. The mobile communication terminal receives the congestion window value, and performs a TCP access for data telecommunication using the initial congestion window value in a slow start algorithm of TCP in a mobile telecommunication environment. The bandwidth of telecommunication network may be more efficiently used by setting an initial value of the congestion window according to the telecommunication situation or available bandwidth.

12 Claims, 5 Drawing Sheets

| 8 | 7 | 6 | 5 | 4 | 3 | 2 | 1 | |
|---|---|---|---|---|---|---|---|---|
| Protocol configuration option ||||||||  octet 1 |
| Length of protocol config. options contents |||||||| octet 2 |
| 1 ext | 0 | 0 | 0 | 0 | Configuration Protocol ||| octet 3 |
|  | \multicolumn{4}{c}{spare} |||| | |

| 8 | 7 | 6 | 5 | 4 | 3 | 2 | 1 | |
|---|---|---|---|---|---|---|---|---|
| Protocol configuration option |||||||| octet 1 |
| Length of protocol config. options contents |||||||| octet 2 |
| 1 ext | 0 | 0 | 1 | 1 | Configuration Protocol ||| octet 3 |
|  | CWND Setting Value |||| | | | |

| Traffic Class | Mean Throughput ("MT") | CWND |
|---|---|---|
| Background | MT < 100,000 octet/s | 1 |
| | MT >= 100,000 octet/s | 2 |
| Interactive | MT < 500,000 octet/s | 2 |
| | MT >= 500,000 octet/s | 3 |
| Streaming | MT < 1,000,000 octet/s | 3 |
| | MT >= 1,000,000 octet/s | 4 |
| Conversational | MT < 500,000 octet/s | 2 |
| | MT >= 500,000 octet/s | 3 |

FIG. 9

| Available Bandwidth ("AB") | CWND |
|---|---|
| 0 % < AB <= 20 % | 1 |
| 20 % < AB <= 40 % | 2 |
| 40 % < AB <= 60 % | 3 |
| 60 % < AB < 100 % | 4 |

COMMUNICATION METHOD BASED ON TRANSMISSION CONTROL PROTOCOL AND MOBILE COMMUNICATION TERMINAL TO PERFORM THE METHOD

CROSS-REFERENCE TO RELATED APPLICATION

This application claims priority from and the benefit of Korean Patent Application No. 10-2008-0052623, filed on Jun. 4, 2008, which is hereby incorporated by reference for all purposes as if fully set forth herein.

BACKGROUND OF THE INVENTION

1. Field of the Invention

The present invention relates to a communication method based on transmission control protocol (TCP), and more particularly, to a communication method based on TCP and a mobile communication terminal for performing the method, where an initial setting value of a congestion window is set according to a communication situation of a communication network to more efficiently use uncongested bandwidth of a communication network.

2. Discussion of the Background

Generally, the transmission control protocol (TCP) is a protocol used to reliably transmit packet data by supplementing repeated transmissions, reducing loss and disordering of internet protocol (IP) packets, and controlling communications so packet data can be transmitted using a sliding window scheme and a congestion control scheme.

The congestion control scheme in TCP allows a terminal to set a volume of transmittable packets without loss caused by congestion according to the available capacity of a communication network. Further, the TCP couples algorithms such as additive increase/multiplicative decrease, slow start, fast retransmit, and fast recovery to control the volume of packets being transmitted by the sender, thus leading to control of the congestion situation.

In the slow start algorithm, the sender uses the size of an advertised window ("AWND") which is informed by a receiver and another window called a congestion window ("CWND"), wherein the CWND is initialized as one segment when a new communication access is established. Each time the sender receives an ACK (acknowledge) message that data was transmitted successfully according to a current CWND value, it increases the CWND value by one segment, thereby continuously increasing the CWND according to successful data transmission. Initially, however, the sender transmits the minimum value of the CWND and AWND. Such a slow start algorithm uses the CWND anytime a communication access is initiated on the basis of TCP and if an ACK message time out occurs.

Previously, when a communication was carried out by applying the slow start algorithm of TCP to establish a data service for a mobile communication terminal, the initial value of the CWND was established as a fixed value of one (1), and increased from the initial value according to the slow start algorithm. However, this created a lengthy process leading up the point where a mobile communication terminal could more fully use the available bandwidth of a communication network according to the congestion level or communication situation.

SUMMARY OF THE INVENTION

This invention provides a communication method based on transmission control protocol (TCP) and mobile communication terminal for performing the method, where a slow start algorithm of TCP in a mobile communication environment has a congestion window initial setting value that is set according to a communication situation of a communication network to more efficiently use uncongested bandwidth of the communication network.

Additional features of the invention will be set forth in the description which follows, and in part will be apparent from the description, or may be learned by practice of the invention.

The present invention discloses a communication method based on TCP, including determining an initial congestion window value on the basis of a predetermined reference by an IP network access unit; transmitting the initial congestion window value to a mobile communication terminal; and receiving a request of a TCP access using the initial congestion window value from the mobile communication terminal.

The present invention also discloses a mobile communication terminal based on TCP, including a communication unit to receive an initial congestion window value transmitted from a communication network and to carry out a TCP communication access to the communication network; a storage unit to store the initial congestion window value; and a control unit to perform the TCP access using the initial congestion window value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 9 is a table illustrating CWND values corresponding to available bandwidth according to an exemplary embodiment of the present invention.

DETAILED DESCRIPTION OF THE ILLUSTRATED EMBODIMENTS

Figure 1:
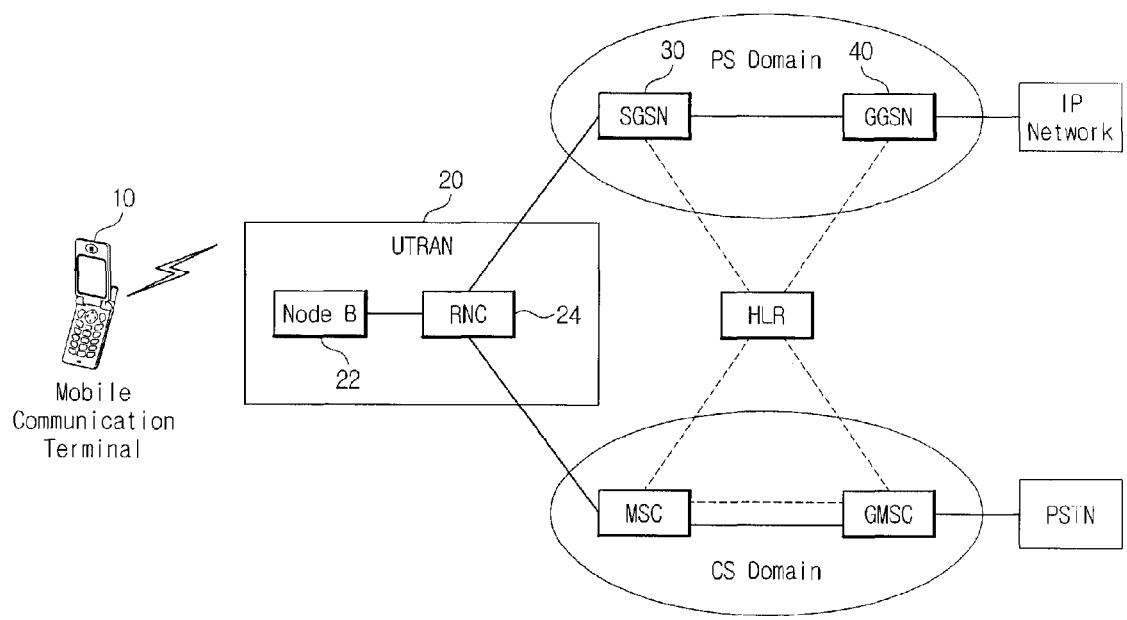
FIG. 1 is a view showing a universal mobile telecommunication system (UMTS) mobile communication network in which exemplary embodiments of the present invention may be used.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Specifically, reference will now be made in detail to various embodiments, examples of which are illustrated in the accompanying drawings and described below.

According to an exemplary embodiment of the present invention, it is possible to more efficiently use the bandwidth of a communication network by setting an initial setting value of a congestion window (CWND) corresponding to a communication situation if communication is carried out on the basis of a slow start algorithm of TCP in a mobile communication environment.

FIG. 1 is a view showing a universal mobile telecommunication system (UMTS) mobile communication network in which exemplary embodiments of the present invention may be used. In FIG. 1, the mobile communication network of UMTS includes UTMS terrestrial radio access network (UTRAN) 20, a packet service (PS) domain, and a circuit service (CS) domain. The UTRAN 20 wirelessly communicates with a mobile communication terminal 10, and includes a node B 22 and a radio network controller (RNC) 24.

Further, the PS domain positioned between the UTRAN 20 and an IP network is used to perform a packet service to the mobile communication terminal 10. The PS domain includes IP network access components including a serving GPRS support node (SGSN) 30 and a gateway GPRS support node (GGSN) 40.

Further, the CS domain positioned between the UTRAN 20 and a public switched telephone network (PSTN) performs packet services such as voice call access to the mobile communication terminal 10. The CS domain includes a mobile switching center (MSC) and a gateway mobile service switching center (GMSC).

If the mobile communication terminal 10 uses a data service to transmit and receive data in the UMTS mobile telecommunication network, it requests the SGSN 30 and GGSN 40 to perform an activate packet data protocol (PDP) context procedure by way of the UTRAN 20, so a PDP address is assigned to the mobile communication terminal 10.

The PDP context is generated in the mobile communication terminal 10, the SGSN 30, and the GGSN 40, and the mobile communication terminal 10 accesses an IP network by performing a TCP access to an application server of the IP network, and transmits and receives data to and from the IP network after the PDP context activation procedure is completed.

If the mobile communication terminal 10 requests the GGSN 40 to perform the PDP context activation procedure, the GGSN 40 implements a procedure to authenticate an external application server in the IP network and obtains a PDP address to be used by the mobile communication terminal 10 depending on kinds of available data services. Simultaneously, the GGSN 40 determines a CWND value according to a determination reference, which may be established in advance, and transmits the PDP address and the CWND value relevant to the address to the mobile communication terminal 10 in response to the PDP context activation procedure. The mobile communication terminal 10 receives the PDP address and the CWND value when it accepts the PDP context activation procedure from the GGSN 40, stores them in a memory, such as storage unit 15 shown in FIG. 2, and uses them when communicating with the IP network based on the TCP access.

The GGSN 40 determines the CWND value according to a reference, such as a QoS parameter class of the mobile communication terminal 10 or a traffic level of the telecommunication network.

If the GGSN 40 determines the CWND value depending on the QoS class of the mobile communication terminal 10, the CWND value may be determined depending on the QoS such as delay, reliability, throughput, or traffic class described on a telecommunication specification, for example.

A higher CWND value may be assigned if the degree of transfer delay is not severe, the priority of reliability is higher, and the mean throughput is higher.

For example, in a 3GPP 24.008 telecommunication specification, a maximum value may be assigned to the CWND for a delay class of 1, a high priority of reliability, a throughput of 10,000,000 octet/h, or a traffic class of conversational class.

Figures 7, 8:
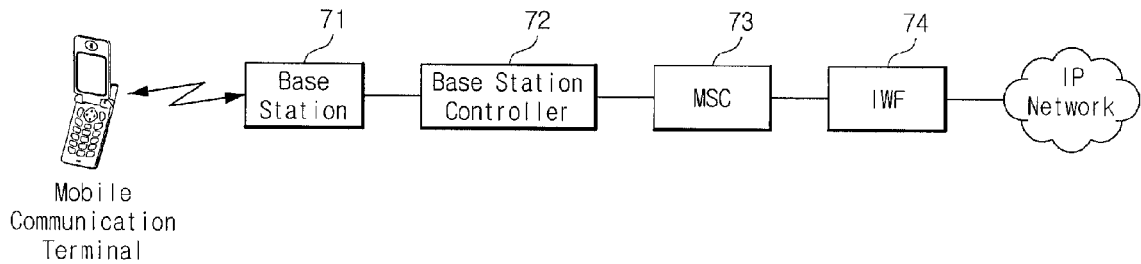
FIG. 8 is a table illustrating CWND values corresponding to traffic classes and mean throughput among parameters of quality of service (QoS) according to an exemplary embodiment of the present invention.

FIG. 8 is a table illustrating CWND values corresponding to traffic classes and mean throughput among parameters of quality of service (QoS) according to an exemplary embodiment of the present invention.

As described in FIG. 8, if the traffic class is "background class" and the mean throughput value is less than 100,000 octet/s, a relatively low value for this traffic class, the CWND value may be established as one. For this traffic class, if the mean throughput value is greater than or equal to 100,000 octet/s, a relatively high value for this traffic class, the CWND value may be established as two.

If the traffic class is "streaming class" and the mean throughput value is greater than or equal to 1,000,000 octet/s, a relatively high value for this traffic class, the CWND value may be established as a higher value such as four.

Meanwhile, if considering the traffic class only, since the "streaming class" and "conversational class" request a real time data transmission and a predetermined bandwidth that is secured, they may establish the CWND values higher than those of other traffic classes.

As such, the CWND value may be established as a relatively higher value in an environment where a higher data processing speed is preferred, and the CWND value may be established as a relatively lower value in an environment where a high data processing speed is not required.

Although the CWND value is established in consideration of the traffic class and mean throughput among the QoS parameters in the exemplary embodiment shown in FIG. 8, they are not limited to the above and the kind and number of the QoS parameters that are referenced to establish the CWND value.

Further, if considering two or more parameter elements to establish the CWND value where each parameter has a different CWND value corresponding thereto, the CWND value may be established as a mean value of the two CWND values corresponding to respective parameters, or it may be established as the CWND value corresponding to a parameter having a high weight among weights assigned to respective parameters, or it may be established as the lower CWND value regardless of other factors surrounding the parameters.

Meanwhile, although a range of CWND values is described from 1 to 4 in the embodiment of FIG. 8, the range is not limited thereto and may be controlled properly according to telecommunication system environments. Further, there may be a CWND limit according to a specification or a telecommunication system environment.

Further, when the GGSN 40 determines the CWND value depending on a traffic level of the telecommunication network, it may measure the traffic level of the telecommunication network in real time, such as an effective bandwidth of the network, and determine the CWND value corresponding to the measured traffic level.

FIG. 9 is a table illustrating CWND values corresponding to available bandwidth according to an exemplary embodiment of the present invention. As shown in FIG. 9, a relatively high CWND value may be established if the value of the available bandwidth is relatively high, and a relatively low CWND value may be established if the value of the available bandwidth is relatively low. In the embodiment of FIG. 9, the maximum value of CWND is assigned if an effective available bandwidth of a network measured is 60% or more. The embodiment of FIG. 9 is only an example, and the range of an available bandwidth corresponding to each CWND value may be controlled depending on telecommunication environments.

Figures 4, 5, 6:
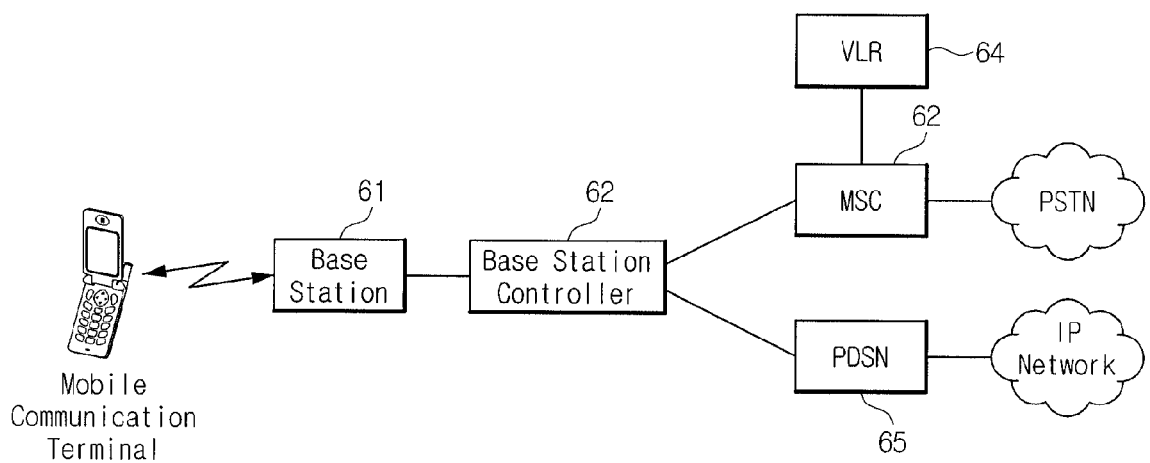
FIG. 4 and FIG. 5 are views illustrating a transmission example of a congestion window (CWND) value according to an exemplary embodiment of the present invention.
FIG. 6 and FIG. 7 are views illustrating additional mobile communication networks in which exemplary embodiments of the present invention may be used.

If the GGSN 40 transmits the CWND value to the mobile communication terminal 10 when it performs a PDP context activation procedure, the GGSN 40 may record the CWND value in spare bits among protocol configuration option (PCO) items included in the message transmitted to the mobile communication terminal 10, the spare bits being currently unused, and may transmit them to the mobile communication terminal 10. The CWND value may be recorded in bits number 4 to 7 of octet 3 among the PCO items, which are not currently used so as to be spare bits, as shown in FIG. 4, which illustrates external network protocol information and additional information related to the PDP context, and transmitted to the mobile communication terminal 10.

Figure 2:
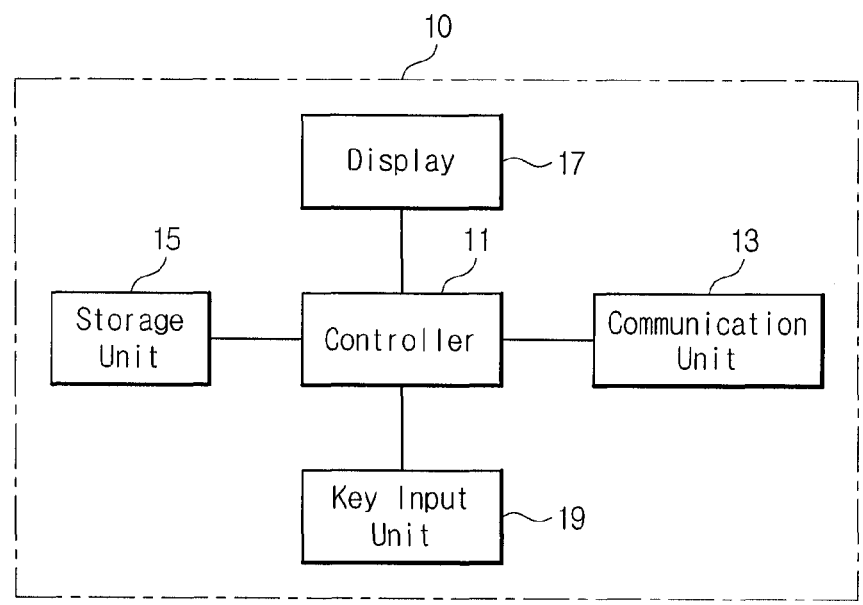
FIG. 2 is a view showing a mobile communication terminal according to an exemplary embodiment of the present invention.

Further, if the mobile communication terminal 10 receives the CWND value included in the message that is transmitted from the GGSN 40 when it performs the PDP context activation procedure, the mobile communication terminal 10 may store the CWND value in a memory, such as the storage unit 15 shown in FIG. 2. The mobile communication terminal 10 transmits and receives data using a network bandwidth corresponding to the CWND value by performing a TCP access using the CWND value.

FIG. 2 is a view showing a mobile communication terminal according to an exemplary embodiment of the present invention. Referring to FIG. 2, the mobile communication terminal 10 includes a controller 11, a communication unit 13, a storage unit 15, a display 17, and a key input unit 19.

The communication unit 13 is driven by the controller 11 and performs a wireless communication with the UTRAN 20. When a data service to transmit and receive data is used, the communication unit 13 requests the SGSN 30 and GGSN 40 to perform a PDP context activation procedure. In response to the request of a PDP context activation procedure from the GGSN 40, the communication unit 13 receives the PDP address and CWND value and transmits them to the controller 11.

The storage unit 15 stores the PDP address and CWND value under the control of the controller 11 and provides them to the controller 11.

The display 17 displays information occurring when the mobile communication terminal 10 is driven by the controller 11 so as to output the information visually.

The key input unit 19 receives instructions to drive the mobile communication terminal 10. The key input unit 19 may be any sort of input unit, for example a keypad having plural keys or a touch pad operable by touch manipulations. Information inputted through the key input unit 19 is applied to the controller 11.

The controller 11 controls general driving of the mobile communication terminal 10. When using a data service, the controller 11 transmits a message to request the PDP context activation procedure to the UTRAN 20 through the communication unit 13, and accordingly may request the SGSN 30 and GGSN 40 to perform the PDP context activation procedure. Further, the controller 11 stores the PDP address and CWND value received through the communication unit 13 in response to the request of the PDP context activation procedure from the GGSN 40 in the storage unit 15, and transmits and receives data to and from the IP network by performing the TCP access through the communication unit 13 using the CWND value stored in the storage unit 15.

Figure 3:
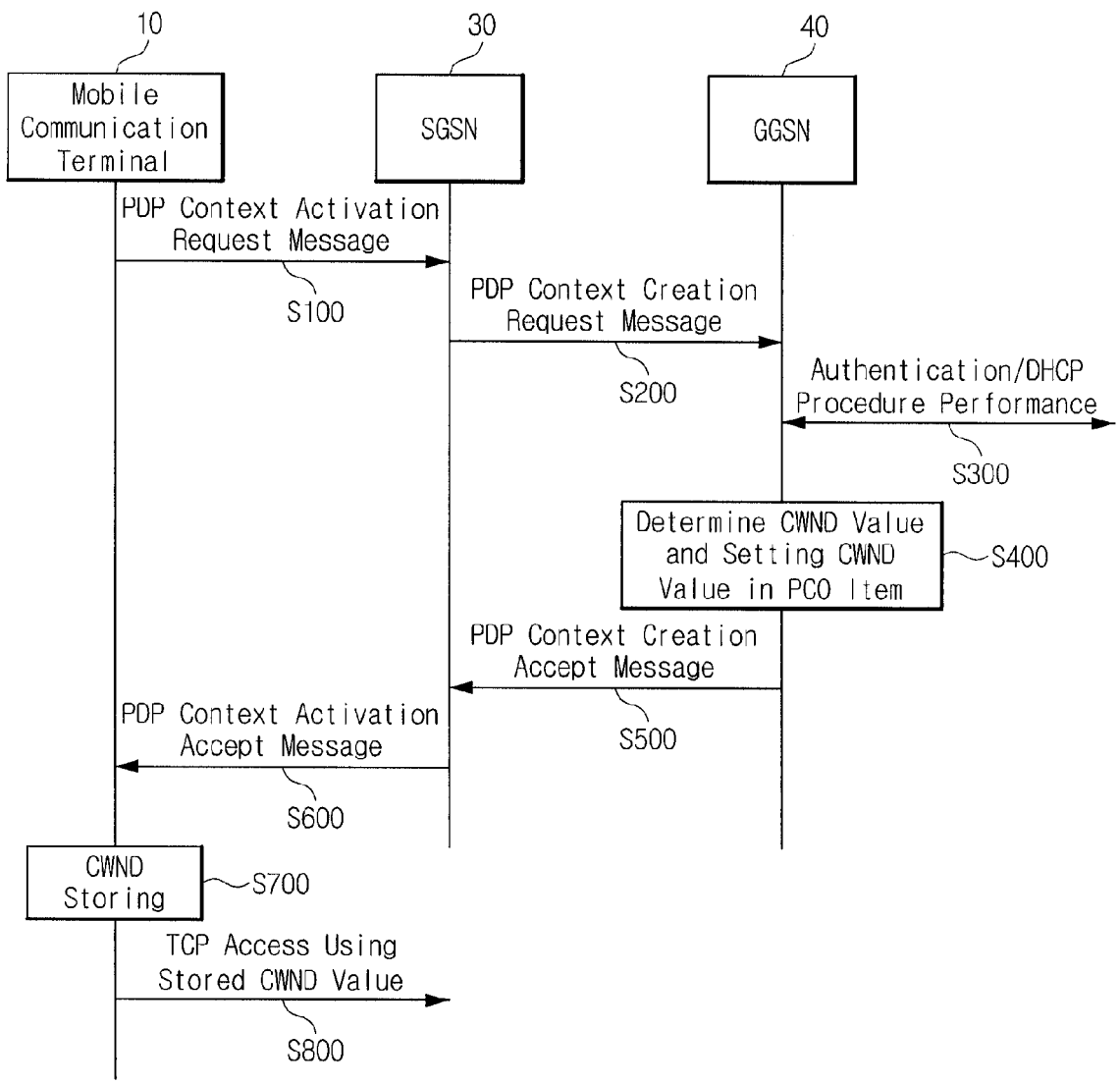
FIG. 3 is a flow diagram illustrating the communication method based on TCP according to an exemplary embodiment of the present invention.

FIG. 3 is a flow diagram illustrating the communication method based on TCP according to an exemplary embodiment of the present invention. A procedure to set an initial setting value of a congestion window (CWND) that corresponds to a telecommunication situation when performing a PDP context procedure according to an exemplary embodiment of the present invention is described with reference to FIG. 3 as follows.

First, the mobile communication terminal 10 transmits a PDP context activation request message to the SGSN 30 through the UTRAN 20 in order to request a performance of the PDP context activation procedure (S100).

Then, the SGSN 30 receives the PDP context activation request message transmitted from the mobile communication terminal 10 and transmits a PDP context creation request message to the GGSN 40 (S200).

The GGSN 40 receives the PDP context creation request message transmitted from the SGSN 30, and performs an authentication procedure with an external server existing in the IP network and a dynamic host configuration protocol (DHCP) procedure to obtain a PDP address to be used in the mobile communication terminal 10, depending on kinds of available data services (S300).

After then, the GGSN 40 determines a CWND value, and establishes the determined CWND value in a protocol configuration option (PCO) item (S400). As described above, the GGSN 40 may determine the CWND value according to a reference established in advance on the basis of a QoS parameter class of the mobile communication terminal 10 or a traffic level of a telecommunication network.

The GGSN 40 transmits a PDP context creation accept message to be transmitted in response to the performance of the PDP context activation procedure and a PCO item in which the CWND value is established, the PCO item being included in the PDP context creation accept message to the SGSN 30 (S500). For example, if the value of the determined CWND is 3, the GGSN 40 may record a CWND value of "0011" in bit numbers 4 to 7 of an octet 3 that are not currently used among the PCO item, as shown in FIG. 5, and transmits them to the mobile communication terminal 10. FIG. 5 illustrates a transmission example of a CWND value to a mobile communication terminal according to an exemplary embodiment of the present invention.

Then, the SGSN 30 receives the PDP context creation accept message transmitted from the GGSN 40, and transmits a PDP context activation accept message including a PCO item in which the CWND value is established to the mobile communication terminal 10 (S600).

Further, the mobile communication terminal 10 receives the PDP context activation accept message transmitted from the SGSN 30 using the telecommunication unit 13, extracts a CWND value recorded in the PCO item included in the message, and stores the extracted CWND value in the storage unit 15 (S700).

Then, the mobile communication terminal 10 performs a TCP access using the CWND value stored in the storage unit

15 (S800). By doing so, the mobile communication terminal 10 transmits and receives data using the slow start algorithm of TCP after applying the initial CWND value determined by the GGSN 40, so that the bandwidth of telecommunication network may be more efficiently used.

Further, in step S500, when the GGSN 40 transmits the CWND value corresponding to telecommunication situations to the mobile communication terminal 10, it may record the CWND value in spare bits such as a negotiated QoS item or a spare half octet item included in a message and transmit the message to the mobile communication terminal 10, instead of recording the CWND value in spare bits of the PCO item included in the message that is transmitted to the mobile communication terminal 10.

Exemplary embodiments of the present invention may be applicable to networks other than the UMTS mobile telecommunication network shown in FIG. 1. FIG. 6 is a view illustrating another mobile telecommunication network in which exemplary embodiments of the present invention may be used.

A base station 61 in FIG. 6 is connected to a base station controller 62 and the base station controller 62 is connected to a mobile switching center (MSC) 63. The MSC 63 is connected to a visitor location register (VLR) 64 and a public switched telephone network (PSTN), so that the base station 61 can provide the mobile communication terminal 10 with a voice call service. Further, in the mobile telecommunication network of FIG. 6, the base station controller 62 is connected to a packet data serving node (PDSN) 65 to perform IP network access, and the PDSN 65 is connected to an IP network so that the base station controller 62 provides the mobile communication terminal 10 with a data service.

If the disclosed method is applied to the mobile telecommunication network of FIG. 6 and the mobile communication terminal 10 requests the PDP context activation, the PDSN 65 determines an initial CWND value corresponding to telecommunication situations, like the afore-described GGSN 40, and transmits the CWND value to the mobile telecommunication terminal 10. The mobile communication terminal 10 receives and stores the CWND value, and performs a TCP access to the IP network using the CWND value. Accordingly, the mobile communication terminal 10 applies a slow start algorithm of TCP with the determined initial CWND value, and transmits and receives data. As such, the mobile communication terminal 10 may more efficiently use the available bandwidth of the telecommunication network by establishing communications on the basis of the initial CWND value corresponding to telecommunication situations such as available bandwidth or to QoS parameters.

FIG. 7 is a view illustrating another mobile telecommunication network in which exemplary embodiments of the present invention may be used. In FIG. 7, the base station 71 is connected to a base station controller 71, and the base station controller 72 is connected to an MSC 73. The MSC 73 is connected to an inter working function (IWF) 74 to provide IP network access, and the IWF 74 is connected to the IP network so that the base station 71 provides the mobile communication terminal 10 with a data service.

If the disclosed method is applied to the mobile telecommunication network of FIG. 7 and the mobile communication terminal 10 requests the PDP context activation, the IWF 74 determines the initial CWND value corresponding to telecommunication situations, like the GGSN 40 as previously described, and transmits the initial CWND value to the mobile telecommunication terminal 10. Accordingly, the mobile communication terminal 10 receives and stores the CWND value and performs TCP access to of the IP network using the initial CWND value. By doing so, the mobile communication terminal 10 applies a slow start algorithm of TCP with the determined initial CWND value, and transmits and receives data. As such, the mobile communication terminal 10 makes a telecommunication on the basis of the initial CWND value corresponding to telecommunication situations so that it may more efficiently use available bandwidth of a telecommunication network.

Further, the PDSN 65 of FIG. 6 or the IWF 74 of FIG. 7 transmits the message transmitted to the mobile communication terminal 10 in response to the PDP context activation procedure from the mobile communication terminal 10 together with the CWND value corresponding to telecommunication situations, the CWND value being included in the message. In this case, the CWND value may be recorded in the spare bits included in the related message that is transmitted to the mobile communication terminal 10 and transmitted as described above.

The telecommunication method and mobile communication terminal for performing the method disclosed herein may be applied to a mobile telecommunication network that provides a mobile communication terminal with a packet data service. According to the telecommunication method based on TCP and mobile communication terminal for performing the method disclosed herein, when a telecommunication is performed by making a telecommunication access using a slow start algorithm of TCP in a mobile telecommunication environment, the bandwidth of telecommunication network may be efficiently used by initially setting a congestion window value correspondingly to telecommunication situations.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A telecommunication method based on transmission control protocol (TCP), comprising:
   determining an initial congestion window value based on a predetermined reference by an IP network access unit;
   transmitting the initial congestion window value to a mobile telecommunication terminal; and
   receiving a request of a TCP access using the initial congestion window value from the mobile communication terminal,
   wherein the initial congestion window value is recorded in extra bits of a negotiated quality of service (QoS) item included in a message transmitted to the mobile communication terminal.

2. The telecommunication method of claim 1, wherein the IP network access unit is a gateway GPRS support node (GGSN), a packet data serving node (PDSN), or an inter working function (IWF).

3. The telecommunication method of claim 1, wherein determining the initial congestion window value comprises determining the initial congestion window value based on a quality of service (QoS) parameter class of the mobile telecommunication terminal.

4. The telecommunication method of claim 1, wherein determining the initial congestion window value comprises determining the initial congestion window value based on a first quality of service (QoS) parameter and a second QoS parameter.

5. A telecommunication method based on transmission control protocol (TCP), comprising:

determining an initial congestion window value based on a predetermined reference by an IP network access unit;

transmitting the initial congestion window value to a mobile telecommunication terminal; and receiving a request of a TCP access using the initial congestion window value from the mobile communication terminal, wherein determining the initial congestion window value comprises determining the initial congestion window value based on a first quality of service (QoS) parameter and a second QoS parameter, and the initial congestion window value is an average of a first initial congestion window value corresponding to the first QoS parameter and a second initial congestion window value corresponding to the second QoS parameter.

6. The telecommunication method of claim 1, wherein determining the initial congestion window value comprises determining the initial congestion window value based on a traffic level of a telecommunication network.

7. A telecommunication method based on transmission control protocol (TCP), comprising:

determining an initial congestion window value based on a predetermined reference by an IP network access unit;

transmitting the initial congestion window value to a mobile telecommunication terminal; and receiving a request of a TCP access using the initial congestion window value from the mobile communication terminal, wherein the initial congestion window value is included in a packet data protocol (PDP) context activation accept message transmitted to the mobile telecommunication terminal, and the initial congestion window value is recorded in extra bits of a protocol configuration option (PCO) item included in the PDP context activation accept message.

8. A telecommunication method based on transmission control protocol (TCP), comprising:

determining an initial congestion window value based on a predetermined reference by an IP network access unit;

transmitting the initial congestion window value to a mobile telecommunication terminal; and receiving a request of a TCP access using the initial congestion window value from the mobile communication terminal, wherein the initial congestion window value is recorded in extra bits of a spare half octet item included in a message transmitted to the mobile communication terminal.

9. The telecommunication method of claim 1, wherein the initial congestion window value is an integer greater than 1.

10. A mobile communication terminal based on transmission control protocol (TCP), comprising:

a communication unit to receive an initial congestion window value transmitted from a telecommunication network, and to carry out a TCP telecommunication access to the telecommunication network;

a storage unit to store the initial congestion window value; and a control unit to perform the TCP telecommunication access using the initial congestion window value, wherein the initial congestion window value is determined based on a first quality of service (QoS) parameter and a second QoS parameter, and is an average of a first initial congestion window value corresponding to the first QoS parameter and a second initial congestion window value corresponding to the second QoS parameter.

11. The mobile communication terminal of claim 10, wherein the initial congestion window value is included in a packet data protocol (PDP) context activation accept message transmitted to the mobile telecommunication terminal.

12. A telecommunication method based on transmission control protocol (TCP), comprising:

determining an initial congestion window value based on a reference by an IP network access unit;

transmitting the initial congestion window value to a mobile telecommunication terminal, the initial congestion window value being recorded in extra bits of a message transmitted to the mobile communication terminal; and receiving a request of a TCP access using the initial congestion window value from the mobile communication terminal, wherein the initial congestion window value is an average of a first initial congestion window value corresponding to a first QoS parameter and a second initial congestion window value corresponding to a second QoS parameter.

* * * * *